Patented Sept. 29, 1953

2,653,917

UNITED STATES PATENT OFFICE 2,653,917

METHOD OF MAKING AN EXPANDED MATERIAL AND THE PRODUCT RESULTING THEREFROM

Henry George Hammon, Stevensville, Mich., assignor, by mesne assignments, to Christopher L. Wilson, Columbus, Ohio No Drawing. Application June 15, 1950,
Serial No. 168,380

26 Claims. (Cl. 260—2.5)

This invention relates to a method of making an expanded material, particularly a sponge, and to the product resulting therefrom, and relates especially to making a detergent resistant sponge material.

In the copending application of Christopher L. Wilson, Serial No. 29,657, filed May 27, 1948, which was a continuation-in-part of application Serial No. 769,537, filed August 19, 1947 and now abandoned, there is described and claimed a method of making a sponge material comprising a reaction product of polyvinyl alcohol and formaldehyde. The described and claimed sponge material has interconnected pores that are capable of holding large quantities of liquid when the sponge is wet. The sponge material is resilient when wet and is capable of resuming its original shape after an applied force has been removed. This sponge, which is primarily a polyvinyl formal, may be used as an ordinary sponge, but is much more wear resistant than ordinary sponges and is more resistant to the reaction of chemicals. The sponge may be provided in the form of a sheet and can be used as a wash cloth, synthetic chamois skin or the like.

I have discovered that a sponge can be made that is more resistant to strong detergent solutions if the polyvinyl alcohol employed in making the sponge of the above application is replaced in whole or in part with either a water-soluble, hydrolyzed copolymer of allylidene diethoxide and vinyl acetate or a water-soluble hydrolyzed copolymer of allylidene diacetate and vinyl acetate. A better sponge also results when the polyvinyl alcohol is used in combination with a dialdehyde. Each of these materials is well known in the art. The water-soluble hydrolyzed copolymer of allylidene diethoxide and vinyl acetate is described in U. S. Patent 2,467,430 and British Patent 609,838. These copolymers are linear copolymers having repeating units of the following structural formula:

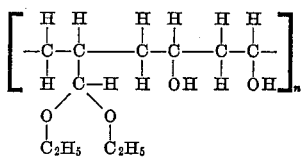

The water-soluble hydrolyzed copolymer of allylidene diacetate and vinyl acetate is described in British Patent 609,138. This copolymer is also a linear copolymer having repeating units of the following structural formula:

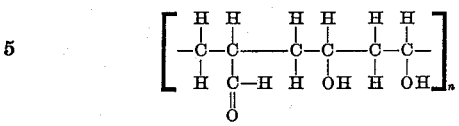

The dialdehydes are well known materials. Each of the above three compositions is either a polyaldehyde or is capable of generating polyaldehyde compounds in acid solution. Both the diethoxide and diacetate copolymers are stable so long as they are not subjected to elevated temperatures, acid conditions, or both. When the diethoxide copolymer is subjected to an acid medium, the acetal or ether groups hydrolyze off to yield free aldehyde groups.

Apparently the copolymers in acid solution cause a cross-linking among themselves or between some of the hydroxyl groups of the polyvinyl alcohol and the aldehyde groups of the copolymer or the dialdehyde, thereby liberating water to form a cross-linked sponge material that is more resistant to a strong detergent solution.

In preparing the improved sponge material of the invention, either a water soluble hydrolyzed copolymer of allylidene diethoxide and vinyl acetate, a water soluble hydrolyzed copolymer of allylidene diacetate and vinyl acetate, a mixture of any of these materials with polyvinyl alcohol, or a mixture of polyvinyl alcohol with a dialdehyde is reacted with formaldehyde in the presence of an acid catalyst while gas bubbles are present in the reacting mixture.

When the dialdehyde is used it may be used as such, but as the dialdehyde is quite reactive, I prefer to use the acetal of the dialdehyde. This acetal reacts with the acid to liberate the dialdehyde. Suitable dialdehydes that may be employed include ethyl acetal of 2,4-dimethyl-2-methoxymethyl glutaraldehyde, ethylene glycol acetal of 2,4-dimethyl-2-methoxymethyl glutaraldehyde, methyl acetal of 2,4-dimethyl-2-methoxymethyl glutaraldehyde, ethylene glycol acetal of 2-hydroxyadipaldehyde, the methyl acetal of 2-hydroxyadipaldehyde, the ethyl acetal of 2-hydroxyadipaldehyde, and the like. In general the tetrakis (hydroxy-ethyl) acetals of the dialdehydes are preferred as they are in general more water soluble. The ethylene glycol acetals of the dialdehydes need not be purified but may be used as prepared by reacting the dialdehyde with an excess of ethylene glycol in the presence of an acid catalyst.

The polyvinyl alcohol that is mixed with the dialdehyde or that may be mixed with either of the copolymers is the material that is produced by hydrolyzing a polyvinyl ester such as polyvinyl acetate. The formaldehyde may be supplied as a gas, a water solution of a gas, as paraformaldehyde, hexamethylene-tetramine, and the like. Compounds of formaldehyde with alcohols such as methylal may also be employed, but these materials are somewhat more expensive than other sources of formaldehyde. Any material may be used so long as it is capable of supplying formaldehyde under the conditions of the reaction in order that the formaldehyde will react with the polyvinyl alcohol.

The reactants are prepared in the form of a solution, and preferably an aqueous solution. This solution may be beaten or otherwise agitated in order to disperse bubbles therethrough and then reacted with the formaldehyde. If desired, all the components of the reaction mixture may be mixed together and then beaten at the beginning of the reaction so as to form dispersed bubbles. The reaction is brought about under the influence of an acid catalyst. Any acid or acid liberating material may be used as the acid, but it is preferred that a mineral acid be employed. One of the most convenient mineral acids is sulfuric acid.

It is preferred that a wetting agent be used in order to aid in forming the bubbles and to make them more uniform in size and to obtain better dispersal of the bubbles in the mass. The wetting agent also aids in maintaining the froth with the bubbles dispersed substantially uniformly therethrough for a time that is sufficient for the reaction to go to completion. When the solution containing the reactants is first frothed, the froth contains individual bubbles. As the reaction proceeds, these bubbles merge with each other in greater or lesser degree to make a porous structure that is capable of absorbing large quantities of water. Because of this porous condition, the finished sponge is resilient when wet and is capable of quickly recovering its shape when wet after an applied distorting force has been removed. The wetting agents can be used singly or in combinations of two or more.

Among the wetting agents that may be used are the following, arranged by number:

| Wetting Agent | Chemical Nature |
|---|---|
| 1 | "Span 20," sorbitan monolaurate. |
| 2 | "Tween 20," a polyoxyalkylene derivative of sorbitan monolaurate. |
| 3 | "Tween 60," a polyoxyalkylene derivative of sorbitan monostearate. |
| 4 | "Tween 80," a polyoxyalkylene derivative of sorbitan monooleate. |
| 5 | "Tween 81," a polyoxyalkylene derivative of sorbitan monooleate. |
| 6 | "Orvus WA," fatty alcohol sulfates, essentially sodium lauryl sulfates. |
| 7 | "Drene," fatty alcohol sulfates, essentially sodium lauryl sulfates. |
| 8 | "Dreft," fatty alcohol sulfates, essentially sodium lauryl sulfates. |
| 9 | "Igepon T," $C_{17}H_{33}CON(CH_3)C_2H_4SO_3Na$. |
| 10 | "Nekal BX," an alkali metal salt of di-isobutyl naphthalene sulfonate prepared by the method set out in U. S. Patent 1,737,792. |
| 11 | "Emulphor ON," a polyethylene ether of a long chain aliphatic alcohol prepared by the method set out in U. S. Patent 1,970,578. |
| 12 | "Emulphor OLA," a polyethylene ether of a long chain aliphatic acid prepared by the method set out in U. S. Patent 1,970,578. |
| 13 | $CH_3-\underset{\underset{CH_3}{\vert}}{\overset{\overset{CH_3}{\vert}}{C}}-CH_2-\underset{\underset{CH_3}{\vert}}{\overset{\overset{CH_3}{\vert}}{C}}-\langle\rangle-O-(C_2H_4O)_m OH$ where $m$ averages between 10 and 11. |
| 14 | a product prepared by Example I of U. S. Patent 2,115,192 and having the formula: $H_{17}C_8-\langle\rangle-OCH_2CH_2OCH_2CH_2SO_3M$ where M is an alkali metal such as sodium. |
| 15 | "Aerosol NC," an alkyl aryl sulfonate. |
| 16 | "Aerosol OS," diisopropyl naphthalene sodium sulfonate. |
| 17 | "Naccosol A," an alkali metal alkyl naphthalene sulfonate. |
| 18 | "Sapamine MS," $CH_3(CH_2)_7CH=CH(CH_2)_7CO-NH-(CH_2)_2-N\underset{\underset{SO_4CH_3}{\vert}}{\overset{\overset{CH_3}{\vert}}{\phantom{N}}}\begin{smallmatrix}C_2H_5\\\\C_2H_5\end{smallmatrix}$ |
| 19 | an aliphatic sodium sulfonate prepared as by Examples 2 or 3 of U. S. Patent 2,370,421. |
| 20 | saponin. |
| 21 | "Ultrawet 40," an alkyl aryl sulfonate such as $R'R^2R^3C_6H_2SO_3Na$, where $R'$, $R^2$ and $R^3$ are very short chains. |

The above wetting agents are commercial products that are frequently mixtures of closely related compounds resulting from their process of manufacture.

The bubbles may be formed by beating air into the mass in known manner by means of any desired beater. When this means is employed, it is preferred that the mass be beaten until it has attained its maximum volume. It will be found that after this maximum volume has been reached, further beating will have no appreciable effect on changing the volume of the mass.

The bubbles may also be formed by chemical means such as the use of powdered calcium carbonate, sodium bicarbonate, or a finely-divided metal such as magnesium, zinc or the like. The acid of the acid catalyst reacts with these materials and thus releases the gas which becomes dispersed throughout the mass. It is preferred, however, that the bubbles be formed by beating as this is more convenient and cheaper.

Any primarily inorganic acid may be used as the acid catalyst so long as it has a dissociation constant of at least $10^{-2}$ and will not react or destroy any of the ingredients used in making the new expanded material. It has been discovered that the purely organic acids are not satisfactory but that acids having organic and inorganic groups in the molecule can be used if the functional group is inorganic and sufficiently acidic. Thus, the useful acid must be primarily inorganic. An example of this type of acid is p-toluene sulfonic acid. The inorganic or mineral acids that may be employed include sulfuric acid, hydrochloric acid, phosphoric acid and nitric acid. Although nitric acid is an oxidizing acid, it can be used in concentrations not appreciably above 12% by weight of the total amount of water present. The amount of acid that is used in any given instance is dependent upon the strength of the acid. Thus the weaker acids must be used in concentrations greater than those in which the strong acids are used. The preferred concentration of acids will be in general between 6 and 45% based on the total amount of water present.

In general, sulfuric acid is preferred because of its ready availability, cheapness and strength. When sulfuric acid is employed, its preferred concentration range is 10 to 30% by weight of the total amount of water present. This same preferred range may be used for hydrochloric acid where the acid is in the form of a 35 to 37% solution by weight of hydrogen chloride gas in water. This preferred range of concentration for hydrochloric acid does not include the water present in the hydrochloric acid solution.

When polyvinyl alcohol is used, various grades of polyvinyl alcohols may be employed with these grades differing in molecular weight. The various grades are known commercially as high, medium and low molecular weights. The most satisfactory way of indicating the molecular weight is the number average molecular weight. The number average molecular weight of the high molecular polyvinyl alcohol is approximately 52,000, the medium 40,000 and the low 14,000. These molecular weights, however, can be varied considerably and produce excellent sponges. The molecular weight may also be indicated as the viscosity of a 4% by weight aqueous solution of the alcohol when measured in a Höeppler viscosimeter at 20° C. Under these conditions the low molecular weight alcohol solution will have a viscosity of about 5, the medium of about 24 and the high of about 55. The polyvinyl alcohol that is used preferably has less than 10% residual hydrolyzable material in the molecule. It is preferred that there be less than 1 to 2% of this residual material.

In preparing the new sponge, it is preferred that from 35 to 80% of the hydroxyl groups be reacted with the formaldehyde. A better grade sponge is prepared if this range is between 40 and 70%.

The grade of polyvinyl alcohol that is used will determine the amount of formaldehyde needed in the reaction, the percentage of the hydroxyl groups that are reacted and the toughness of the resulting product. In general, it may be said that the higher the molecular weight of the alcohol the lower is its solubility in water and the lesser the activity of the alcohol toward the formaldehyde. The higher molecular weight alcohols, however, result in a tougher sponge.

In one manner of practicing the invention, an aqueous solution of all ingredients is prepared and the mixture is beaten to a froth with a high speed rotary beater. The froth is then poured into a mold and permitted to set. While in the mold, the aldehyde and hydroxyl groups react. The reaction is permitted to proceed until from approximately 35 to 80% of the hydroxyl groups present have been reacted. At the end of the reaction time, the resulting sponge is removed from the mold and washed with water until substantially free from acid, unreacted reactants, and the like. A satisfactory sponge material is flexible when wet with water and rapidly absorbs an amount of water that is only a little less than its own volume. It is sufficiently strong to withstand a considerable amount of abrasion and has a high tensile strength. The sponge materials made in this manner have been found to be more wear resistant than a natural sponge and to be unaffected by strongly acid or alkaline solutions which rapidly disintegrate a natural sponge.

The new sponges may be made of a water soluble hydrolyzed copolymer of allylidene diethoxide and vinyl acetate, this copolymer in combination with polyvinyl alcohol, a water soluble hydrolyzed copolymer of allylidene diacetate and vinyl acetate, this copolymer in combination with polyvinyl alcohol, or a dialdehyde in combination with polyvinyl alcohol. Each of the copolymers should contain up to about 15 mol percent of allylidene combination and the remainder to make 100 mol percent of the vinyl acetate. When the dialdehyde and polyvinyl alcohol combination is employed, the dialdehyde should be used in an amount up to about 15 mol percent with the remainder being polyvinyl alcohol. In the preferred sponges, these mol percents should preferably be from between 0.5 to 10, while best results have been obtained when the mol percent is about 3 to 6.

As was mentioned above, the reactants are preferably beaten to a froth, although frothing agents may be used if desired. The most stable froth is that froth which is as stiff as possible. It has been discovered that increasing the amounts of acid or water or acid and water increases the amount of froth. If the amount of froth is increased too greatly, however, the resulting sponge will be weak. The apparent specific gravity of the final sponge, including the pores, is preferably from 0.03 to 0.15. In actual commercial production, it has been found that the most satisfactory bulk sponges have apparent specific gravities between about 0.05 to 0.06. In preparing the solutions from which the froth is made, it is preferred that the solution contain between about 5 and 25% of the copolymer and polyvinyl alcohol mixture or dialdehyde and polyvinyl alcohol mixture by weight of water. When polyvinyl alcohol is used a higher concentration of the low molecular polyvinyl alcohol will be required than of the medium and high and a higher concentration of the medium will be required than of the high.

The reaction time and temperature are inversely dependent upon each other so that if a relatively low temperature is used, a relatively long reacting time is necessary; conversely, when the temperature is relatively high, the reacting time is considerably reduced. It is generally preferred that a temperature between about 20 and 60° C. be employed. Other temperatures may, of course, be used, but with extremely low temperatures, relatively great lengths of time are required. Where extremely high temperatures are employed, there is the problem of obtaining uniform heating throughout the mass of froth. It is, of course, true that froth containing dispersed bubbles of air or other gas is a very poor conductor of heat. It has been found that in varying the temperature 10°, for example, a time factor of 2 or 3 is required. Thus, in one embodiment where heating the froth at 60° C. required two hours for completion of the reaction, heating at 50° C. required six hours, at 40° C.—18 hours, and at 30° C.—54 hours. The concentration of the acid catalyst also affects the time of reaction. Thus, a given reaction takes place about twice as fast with 20% acid as with 14% acid; both percentages being by weight of the total amount of water present. All these factors and variables are well understood by those skilled in the art.

After forming bubbles of air or other gas in the reaction mixture, it is found that as the reaction proceeds, the adjacent bubbles merge with each other to form pores or openings in the material. When the reaction is complete, it will be found that the mass of material contains large numbers of interconnected pores with the outer ends of the pores that are adjacent the outer surface of the sponge being open. If a thin skin should be formed over the outer surface of the sponge material, this may be removed by cutting it away to expose the pores. Because of the large number of pores, the sponge material will be capable of absorbing almost its own volume of water.

By limiting the reaction so that not less than 35% nor more than 80% of the hydroxyl groups present are reacted, a tough resilient sponge is produced. The sponge, when dry, is somewhat hard and resistant to compression. However, after it has been wet with water, it becomes quite soft and resilient.

In order to produce a satisfactory sponge, it is necessary that the bubbles in the reacting mass merge to a certain degree with each other during the reaction. Thus, the original dispersion of bubbles or froth must not be too stable so that the final bubbles are small and discrete and also must not be so unstable that the mass has collapsed before the reaction has proceeded sufficiently to give rigidity to the mass. These factors are largely determined by the stability of the froth and this can easily be controlled by the type and amount of wetting agent used. For any given grade of polyvinyl alcohol and for any type of wetting agent, the optimum amounts may be easily determined by those skilled in the art. The wetting agents that are employed are those that retain their surface active properties in the presence of formaldehyde and acid, and include large numbers of commercial agents.

The reacting materials are maintained in molds of desired shape during the reaction. These molds may be of any desired material that is resistant to acid and to formaldehyde. The molds may be made of glass, earthenware, wood, acid resistant metal, synthetic plastics, rubber and the like.

In one method of making the new sponge, the desired amount of reactants were added to the desired amount of water in a heated vessel equipped for agitation, and the whole mixed until a complete solution was obtained. This solution was then transferred to storage and cooling vats. Portions of the solution were withdrawn and each portion was mixed with a formaldehyde compound, such as paraformaldehyde, a wetting agent and acid. The solution was then beaten until the resulting froth attained a maximum volume. At the end of this time, the froth was poured into wooden molds which were transferred to a heated room and left there until the mass was sufficiently reacted. After the completion of the reaction, the sponge material was removed from the molds and washed to remove the acid and other unreacted materials. At the end of this washing operation, the blocks of sponge were cut into proper size for packaging.

The sponge material may be colored with acid stable pigments, or dyed with substantive dyes or vat dyes. Thus, the coloring agents may be added with the other ingredients at the beginning of the manufacturing operation and dispersed through the reaction mixture during the beating or other frothing operations. The substantive and vat dyes, however, are preferably incorporated after the sponges have been made. The ordinary water-soluble cotton dyes may be used for coloring the sponges. As examples of the coloring agents, a blue color may be produced by using a phthalocyanine compound, a brown, orange, or red color from suitable iron oxide and a green color from chromic oxide. There are, of course, many other dyes and coloring agents that may be employed.

If desired, inert fillers may be introduced into the sponge with these fillers preferably being mixed in the solution prior to the agitation thereof. Practically any inert filler may be employed. These include wood flour, glass wool, various earths, such as kieselguhr, and the like. In order that the sponge will not be undesirably weakened, it is preferred that an excessive amount of fillers not be employed. The filler may be or include an abrasive, such as pumice, if desired, so that the resulting sponge will have an abrasive surface.

A total amount of water or other solvent is preferably used so that the froth is capable of being maintained at approximately a constant volume during the reaction and so that the froth is sufficiently fluid to be poured into the molds after the frothing and before the reaction has progressed an appreciable extent.

The new sponge materials may be used to make porous sheets that are usable as wash cloths or artificial chamois skins. Where this is done the sponge material is sliced into sheets and these sheets pressed lightly with a weight while being heated. The temperature that is used should not be high enough to scorch the sponge material, but should be sufficiently high to soften and mold the material. It has been discovered that this temperature should be less than 160–180° C. as at these temperatures the sponge material will be scorched quite easily. A preferred temperature is between 100–120° C. The pressure that is applied will depend upon the desired porosity of the final sheet and the depth thereof. In one example, this pressure was sufficient to reduce the thickness of the sheet to about one-third its original thickness. Ordinarily the specific gravity of the resulting sheet material will be between about 0.09 and 0.15. The small voids in the sheet material will be found to have become generally elliptical in a directional substantially parallel to the surface where the heat and pressure were applied due to the heating and pressing operation. The sides of these voids will generally not be adhered to each other so that the sheet material is quite resilient when wet and is capable of absorbing large quantities of water. When the sponge material is to be used for making sheet material, it is preferred that the voids be relatively small and uniform so that no holes or excessively weak points will be produced in the material.

The following examples illustrate several typical methods of preparing the new expanded materials. These are merely illustrative, however, and are not to be considered as a limitation upon the disclosure of the invention. It is believed obvious that the numbers and types of possible examples are practically limitless.

*Example 1*

145 g. 12.5% polyvinyl alcohol solution in water, 65 cc. 55% sulfuric acid, 2 cc. undiluted foaming agent No. 12, 1 cc. ethylene glycol acetal of 2,4-dimethyl-2-methoxymethyl glutaraldehyde and 6.5 g. paraformaldehyde were mixed together and beaten until a froth of maximum volume was achieved. The froth was poured into a mold and permitted to set. After this setting, the sponge material was washed to remove the acid, foaming agent and unreacted materials.

Example 2

145 g. 12.5% polyvinyl alcohol solution in water, 65 cc. 55% sulfuric acid, 2 cc. undiluted foaming agent No. 12, 1 cc. ethyl acetal of 2,4-dimethyl-2-methoxymethyl glutaraldehyde and 7 g. paraformaldehyde were mixed together and beaten until a froth of maximum volume was achieved. The froth was poured into a mold and permitted to set. After this setting, the sponge material was washed to remove the acid, foaming agent and unreacted materials.

Example 3

145 g. 12.5% polyvinyl alcohol solution in water, 65 cc. 55% sulfuric acid, 2.5 cc. undiluted foaming agent No. 12, 2 cc. ethylene glycol acetal of 2-hydroxadipaldehyde and 6.5 g. paraformaldehyde were mixed together and beaten until a froth of maximum volume was achieved. The froth was poured into a mold and permitted to set. After this setting, the sponge material was washed to remove the acid, foaming agent, and unreacted materials.

Example 4

135 g. 12.5% polyvinyl alcohol solution in water, 10 g. 12.5% solution of hydrolyzed copolymer of vinyl acetate and allylidene diacetate, containing 15 mol percent of allylidene diacetate, in water, 2 cc. undiluted foaming agent No. 12, 65 cc. 55% sulfuric acid and 7 g. paraformaldehyde were mixed together and beaten until a froth of maximum volume was achieved. The froth was poured into a mold and permitted to set. After this setting, the sponge material was washed to remove the acid, foaming agent and unreacted materials.

Example 5

105 g. 12.5% polyvinyl alcohol solution in water, 40 g. 12.5% solution of hydrolyzed copolymer of vinyl acetate and allylidene diacetate, containing 15 mol percent of allylidene diacetate, in water, 65 cc. 55% sulfuric acid, 2 cc. undiluted foaming agent No. 12, and 7 g. paraformaldehyde were mixed together and beaten until a froth of maximum volume was achieved. The froth was poured into a mold and permitted to set. After this setting, the sponge material was washed to remove the acid, foaming agent and unreacted materials.

Example 6

125 g. 12.5% polyvinyl alcohol solution in water, 20 g. 12.5% solution of hydrolyzed copolymer of vinyl acetate and allylidene diacetate, containing 15 mol percent allylidene diacetate, in water, 65 cc. 55% sulfuric acid, 2 cc. undiluted foaming agent No. 12, and 7 g. paraformaldehyde were mixed together and beaten until a froth of maximum volume was achieved. The froth was poured into a mold and permitted to set. After this setting, the sponge material was washed to remove the acid, foaming agent and unreacted materials.

Example 7

145 g. 12.5% polyvinyl alcohol solution in water, 65 cc. 55% sulfuric acid, 2.5 cc. undiluted foaming agent No. 12, 1 cc. methyl acetal of 2,4-dimethyl-2-methoxymethyl glutaraldehyde and 7 g. paraformaldehyde were mixed together and beaten until a froth of maximum volume was achieved. The froth was poured into a mold and permitted to set. After this setting, the sponge material was washed to remove the acid, foaming agent and unreacted materials.

Example 8

145 g. 12.5% solution in water of hydrolyzed copolymer of allylidene diacetate and vinyl acetate containing 15 mol percent allylidene diacetate, 2 cc. undiluted foaming agent No. 12, 0.4 cc. undiluted foaming agent No. 3 were mixed together and beaten to a froth of about 700 cc. 6 g. paraformaldehyde and 65 cc. of 55% sulfuric acid were then added to the foam with slow beating. The froth was poured into a mold and permitted to set. After this setting the sponge material was washed to remove the acid, foaming agent and unreacted materials.

Having described my invention as related to various embodiments of the same, it is my intention that the invention be not limited by any of the details of description unless otherwise specified, but rather be construed broadly within its spirit and scope as set out in the accompanying claims.

I claim:

1. The method of making a sponge material having interconnected pores which comprises forming a substantially stable dispersion of bubbles in an aqueous solution comprising an acid in which the acid functional group is inorganic and having a dissociation constant of at least $10^{-2}$, a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and reacting said formaldehyde and said member of said class until approximately 35 to 80% of the hydroxyl groups of the reactants have been reacted.

2. The method of making a sponge material having interconnected pores which comprises forming dispersed bubbles in an aqueous solution comprising an acid in which the acid functional group is inorganic and having a dissociation constant of at least $10^{-2}$, a foam stabilizing wetting agent, a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and reacting said member of said class and formaldehyde from a material capable of supplying said formaldehyde until approximately 35 to 80% of the hydroxyl groups of the reactants have been reacted.

3. The method of making a sponge material having interconnected pores which comprises forming dispersed bubbles in an aqueous solution comprising an acid in which the acid functional group is inorganic and having a dissociation constant of at least $10^{-2}$, a foam stabilizing wetting agent, a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing 0.5 to 10 mol per cent of the allylidene compound, and a mixture of a dialdehyde and polyvinyl alcohol containing 0.5 to 10 mol percent of said dialdehyde, said polyvinyl alcohol containing less than 10% residual hydrolyzable material in the molecule, and reacting said member of said class and formaldehyde from a material capable of supplying said formaldehyde until approximately 35 to 80% of the hydroxyl groups of the reactants have been reacted.

4. The method of making a sponge material having interconnected pores which comprises forming dispersed bubbles in an aqueous solution comprising an acid in which the acid functional group is inorganic and having a dissociation constant of at least $10^{-2}$, a foam stabilizing wetting agent, a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing 3 to 6 mol percent of the allylidene compound, and a mixture of a dialdehyde and polyvinyl alcohol containing 3 to 6 mol percent of said dialdehyde, said polyvinyl alcohol containing less than 10% residual hydrolyzable material in the molecule, and reacting said member of said class and formaldehyde from a material capable of supplying said formaldehyde until approximately 35 to 80% of the hydroxyl groups of the reactants have been reacted.

5. The method of making a sponge material having interconnected pores which comprises preparing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule and a foam stabilizing wetting agent, beating the solution to a froth, and reacting said member with formaldehyde from a material capable of supplying said formaldehyde until approximately 35 to 80% of the hydroxyl groups of the reactants have been reacted, said reaction taking place in the presence of an acid catalyst in which the acid functional group is inorganic and having a dissociation constant of at least $10^{-2}$.

6. The method of making a sponge material having interconnected pores which comprises providing a solution comprising a foam stabilizing wetting agent, a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, forming dispersed bubbles therein, and reacting said member with an amount of formaldehyde capable of reacting with from approximately 40 to 70% of the hydroxyl groups of the reactants in the presence of an acid catalyst in which the acid functional group is inorganic and having a dissociation constant of at least $10^{-2}$.

7. The method of making a sponge material having interconnected pores which comprises preparing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule and a foam stabilizing wetting agent, beating the solution until a froth of maximum volume has been obtained, and reacting said member with formaldehyde from a material capable of supplying said formaldehyde until approximately 40 to 70% of the hydroxyl groups of the reactants have been reacted, said reaction taking place in the presence of an acid catalyst in which the acid functional group is inorganic and having a dissociation constant of at least $10^{-2}$.

8. The method of forming a sponge material having interconnected pores which comprises providing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and a foam stabilizing wetting agent, forming dispersed bubbles therein, and reacting said member with an amount of formaldehyde capable of reacting with from approximately 35 to 80% of the hydroxyl groups of the reactants in the presence of from about 6 to 45% by weight of the water present of an acid in which the acid functional group is inorganic and having a dissociation constant of at least $10^{-2}$.

9. The method of forming a sponge material having interconnected pores which comprises providing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and a foam stabilizing wetting agent, forming dispersed bubbles therein, and reacting said member with an amount of formaldehyde capable of reacting with from approximately 40 to 70% of the hydroxyl groups of the reactants in the presence of from about 6 to 45% by weight of the water present of an acid in which the acid functional group is inorganic and having a dissociation constant of at least $10^{-2}$.

10. The method of making a sponge material having interconnected pores which comprises preparing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and a foam stabilizing wetting agent, beating the solution until a froth of maximum volume has been obtained, and reacting said member with formaldehyde from a material capable of supplying said formaldehyde until approximately 35 to 80% of the hydroxyl groups of the reactants has been reacted, said reaction taking place in the presence of from about 6 to 45% by weight of the water present of an acid catalyst in which the acid functional group is inorganic and having a dissociation constant of at least $10^{-2}$.

11. The method of making a sponge material having interconnected pores which comprises preparing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and a foam stabilizing wetting agent, beating the solution until a froth of maximum volume has been obtained, and reacting said member with formaldehyde from a material capable of supplying said formaldehyde until approximately 40 to 70% of the hydroxyl groups of the reactants have been reacted, said reaction taking place in the presence of from about 6 to 45% by weight of the water present of an acid catalyst in which the acid functional group is inorganic and having a dissociation constant of at least $10^{-2}$.

12. The method of making a sponge material having interconnected pores which comprises preparing an aqueous solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol precent of the allylidene compound, and a mixture of a dialdehyde and polyvinyl alcohol containing up to 15 mol percent of said dialdehyde, said polyvinyl alcohol containing less than 10% residual hydrolyzable material in the molecule, and a foam stabilizing wetting agent in sufficient water to produce a stable froth when beaten, beating the solution until a froth of maximum volume has been obtained, and reacting said member with formaldehyde from a material capable of supplying said formaldehyde until approximately 40 to 70% of the hydroxyl groups of the reactants have been reacted, said reaction taking place in the presence of from about 6 to 45% by weight of the water present of an acid catalyst in which the acid functional group is inorganic and having a dissociation constant of at least $10^{-2}$.

13. A sponge material comprising a reaction product of a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and formaldehyde in which from approximately 35 to 80% of the hydroxyl groups of the reactants have been reacted, said sponge material having interconnected pores therein with their outer ends exposed and, when wet, being capable of resuming its original shape after an applied force has been removed and being substantially free of unreacted polyvinyl alcohol molecules.

14. A sponge material comprising a reaction product of a member of the class consisting of a water-soluble hydrolyzed copolymer of allylidene diethoxide and vinyl acetate, a mixture of said copolymer and polyvinyl alcohol, a water-soluble hydrolyzed copolymer of allylidine diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, and formaldehyde in which from approximately 40 to 70% of the hydroxyl groups of the reactants have been reacted, said sponge material having a specific gravity of about 0.03 to 0.15 and having interconnected pores therein with their outer ends exposed and, when wet, being capable of resuming its original shape after an applied force has been removed and being substantially free of unreacted polyvinyl molecules.

15. The method of making a porous absorbent material which comprises preparing a sponge material by forming dispersed bubbles in a solution comprising a member of the class consisting of a water-soluble hydrolyzed copolymer of allylidene diethoxide and vinyl acetate, a mixture of said copolymer and polyvinyl alcohol, a water-soluble hydrolyzed copolymer of allylidene diacetate and vinyl acetate, a mixture of said copolymer and polyvinyl alcohol, each of said copolymers containing up to 15 mol percent of the allylidene compound, and a mixture of a dialdehyde and polyvinyl alcohol containing up to 15 mol percent of said dialdehyde, said polyvinyl alcohol containing less than 10% residual hydrolyzable material in the molecule, reacting with formaldehyde until approximately 35 to 80% of the hydroxyl groups of the reactants have been reacted, and applying pressure to said material while heating at a temperature sufficient to give the material a permanent set but insufficient to cause scorching of said material.

16. In the preparation of a sponge material having interconnected pores, the method which comprises forming a substantially stable dispersion of bubbles in an aqueous solution including an acid in which the acid functional group is inorganic and having a dissociation constant of at least $10^{-2}$, polyvinyl alcohol containing less than 10% residual hydrolyzable material in the molecule, and formaldehyde, reacting said alcohol and formaldehyde until approximately 35 to 80% of the hydroxyl groups of the alcohol have been reacted, and reacting a portion of the remaining hydroxyl groups with a dialdehyde in an amount up to 15 mol percent based on the total of the amounts of polyvinyl alcohol and dialdehyde.

17. In the preparation of a sponge material having interconnected pores, the method which comprises forming a substantially stable dispersion of bubbles in an aqueous solution including an acid in which the acid functional group is inorganic and having a dissociation constant of at least $10^{-2}$, a foam stabilizing wetting agent, polyvinyl alcohol containing less than 10% residual hydrolyzable material in the molecule, and formaldehyde, reacting said alcohol and formaldehyde until approximately 35 to 80% of the hydroxyl groups of the alcohol have been reacted, and reacting a portion of the remaining hydroxyl groups with a dialdehyde in an amount up to 15 mol percent based on the total of the amounts of polyvinyl alcohol and dialdehyde.

18. In the preparation of a sponge material having interconnected pores, the method which comprises forming a substantially stable dispersion of bubbles in an aqueous solution including an acid in which the acid functional group is inorganic and having a dissociation constant of at least $10^{-2}$, polyvinyl alcohol containing less than 10% residual hydrolyzable material in the molecule, and formaldehyde, reacting said alcohol and formaldehyde until approximately 35 to 80% of the hydroxyl groups of the alcohol have been reacted, and reacting a portion of the remaining hydroxyl groups with a dialdehyde in an amount of 0.5 to 10 mol percent based on the total of the amounts of polyvinyl alcohol and dialdehyde.

19. In the preparation of a sponge material having interconnected pores, the method which comprises forming a substantially stable dispersion of bubbles in an aqueous solution including an acid in which the acid functional group is inorganic and having a dissocation constant of at least $10^{-2}$, polyvinyl alcohol containing less than 10% residual hydrolyzable material in the molecule, and formaldehyde, reacting said alcohol and formaldehyde until approximately 35 to 80% of the hydroxyl groups of the alcohol have been reacted, and reacting a portion of the remaining hydroxyl groups with a dialdehyde in an amount of 3 to 6 mol percent based on the total of the amounts of polyvinyl alcohol and dialdehyde.

20. In the preparation of a sponge material having interconnected pores, the method which comprises forming a substantially stable dispersion of bubbles in an aqueous solution including an acid in which the acid functional group is inorganic and having a dissociation constant of at least $10^{-2}$, polyvinyl alcohol containing less than 10% residual hydrolyzable material in the molecule, and formaldehyde, reacting said alcohol and formaldehyde until approximately 40 to 70% of the hydroxyl groups of the alcohol have been reacted, and reacting a portion of the remaining hydroxyl groups with a dialdehyde in an amount up to 15 mol percent based on the total of the amounts of polyvinyl alcohol and dialdehyde.

21. In the preparation of a sponge material having interconnected pores, the method which comprises forming a substantially stable dispersion of bubbles in an aqueous solution including 6 to 45% by weight of the water present of an acid in which the acid functional group is inorganic and having a dissociation constant of at least $10^{-2}$, polyvinyl alcohol containing less than 10% residual hydrolyzable material in the molecule, and formaldehyde, reacting said alcohol and formaldehyde until approximately 35 to 80% of the hydroxyl groups of the alcohol have been reacted, and reacting a portion of the remaining hydroxyl groups with a dialdehyde in an amount up to 15 mol percent based on the total of the amounts of polyvinyl alcohol and dialdehyde.

22. In the preparation of a sponge material having interconnected pores, the method which comprises forming a substantially stable dispersion of bubbles in an aqueous solution including 6 to 45% by weight of the water present of an acid in which the acid functional group is inorganic and having a dissociation constant of at least $10^{-2}$, a form stabilizing wetting agent, polyvinyl alcohol containing less than 10% residual hydrolyzable material in the molecule, and formaldehyde, reacting said alcohol and formaldehyde until approximately 40 to 70% of the hydroxyl groups of the alcohol have been reacted, and reacting a portion of the remaining hydroxyl groups with a dialdehyde in an amount of 3 to 6 mol percent based on the total of the amounts of polyvinyl alcohol and dialdehyde.

23. A sponge material comprising a reaction product of polyvinyl alcohol containing less than 10% residual hydrolyzable material in the molecule, formaldehyde, and up to 15 mol percent of a dialdehyde based on the total of the amounts of the alcohol and the dialdehyde, said sponge material having interconnected pores therein with their outer ends exposed and, when wet, being capable of resuming its original shape after an applied force has been removed and being substantially free of unreacted polyvinyl alcohol molecules, and in which from 35 to 80% of the hydroxyl groups of the alcohol have been reacted.

24. A sponge material comprising a reaction product of polyvinyl alcohol containing less than 10% residual hydrolyzable material in the molecule, formaldehyde, and up to 15 mol percent of a dialdehyde based on the total of the amounts of the alcohol and the dialdehyde, said sponge material having a specific gravity of about 0.03 to 0.15 and having interconnected pores therein with their outer ends exposed and, when wet, being capable of resuming its original shape after an applied force has been removed and being substantially free of unreacted polyvinyl alcohol molecules, and in which from 40 to 70% of the hydroxyl groups of the alcohol have been reacted.

25. A sponge material comprising polyvinyl alcohol having 35 to 80% of its hydroxyl groups reacted with formaldehyde and up to 15% of its hydroxyl groups reacted with a dialdehyde, said sponge material having interconnected pores therein with their outer ends exposed and, when wet, being capable of resuming its original shape after an applied force has been removed and being substantially free of unreacted polyvinyl alcohol molecules.

26. A sponge material comprising polyvinyl alcohol having 40 to 70% of its hydroxyl groups reacted with formaldehyde and up to 15% of its hydroxyl groups reacted with a dialdehyde, said sponge material having a specific gravity of about 0.03 to 0.15 and having interconnected pores therein with their outer ends exposed and, when wet, being capable of resuming its original shape after an applied force has been removed and being substantially free of unreacted polyvinyl alcohol molecules.

HENRY GEORGE HAMMON.

References Cited in the file of this patent

UNITED STATES PATENTS

| Number | Name | Date |
| --- | --- | --- |
| 2,387,831 | Cogan et al. | Oct. 30, 1945 |
| 2,467,430 | Izard | Apr. 19, 1949 |
| 2,485,239 | Izard | Oct. 18, 1949 |

FOREIGN PATENTS

| Number | Country | Date |
| --- | --- | --- |
| 573,966 | Great Britain | Dec. 14, 1945 |
| 578,884 | Great Britain | July 16, 1946 |
| 769,011 | France | June 5, 1934 |